US011735165B2

(12) United States Patent
Fang (10) Patent No.: US 11,735,165 B2
(45) Date of Patent: Aug. 22, 2023

(54) TASK-ORIENTED DIALOG SYSTEM AND METHOD THROUGH FEEDBACK

(71) Applicant: Beijing DiDi Infinity Technology and Development Co., Ltd., Beijing (CN)

(72) Inventor: Scot Fang, Los Angeles, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 216 days.

(21) Appl. No.: 17/118,845

(22) Filed: Dec. 11, 2020

(65) Prior Publication Data

US 2022/0189460 A1 Jun. 16, 2022

(51) Int. Cl.
| | |
|---|---|
| G10L 15/06 | (2013.01) |
| G10L 15/22 | (2006.01) |
| G06F 3/16 | (2006.01) |
| G10L 15/01 | (2013.01) |
| G06F 40/56 | (2020.01) |
| G06N 20/00 | (2019.01) |
| G06F 9/451 | (2018.01) |

(52) U.S. Cl.
CPC ............ *G10L 15/063* (2013.01); *G06F 9/453* (2018.02); *G06F 40/56* (2020.01); *G06N 20/00* (2019.01); *G10L 15/01* (2013.01); *G10L 2015/0638* (2013.01)

(58) Field of Classification Search
CPC ................... G10L 15/063; G10L 15/01; G10L 2015/0638; G06F 9/453; G06F 40/56; G06N 20/00
See application file for complete search history.

(56) References Cited

U.S. PATENT DOCUMENTS

| | | | | |
|---|---|---|---|---|
| 11,200,885 | B1* | 12/2021 | Mandal | G06F 40/279 |
| 2014/0188477 | A1* | 7/2014 | Zhang | G10L 15/22 |
| | | | | 704/257 |
| 2017/0330077 | A1* | 11/2017 | Williams | G06N 3/042 |
| 2017/0330377 | A1* | 11/2017 | Akselrod | H04N 5/33 |
| 2018/0307745 | A1* | 10/2018 | Bachrach | G06N 3/006 |
| 2019/0098136 | A1* | 3/2019 | Odinak | |
| 2019/0130904 | A1* | 5/2019 | Homma | G10L 15/18 |
| 2019/0304451 | A1* | 10/2019 | Sugiyama | G06F 3/16 |
| 2019/0332667 | A1* | 10/2019 | Williams | G06N 5/022 |

(Continued)

OTHER PUBLICATIONS

Antoine Bordes et al., "Learning end-to-end goal-oriented dialog", arXiv:1605.07683v4 [cs.CL] Mar. 30, 2017.

(Continued)

*Primary Examiner* — Olujimi A Adesanya
(74) *Attorney, Agent, or Firm* — Sheppard Mullin Richter & Hampton LLP (57) ABSTRACT

An automatic agent may be improved through feedback. A user input may be received through a user interface. A plurality of current utterance variables may be obtained by tokenizing the user input. The automatic agent may execute a machine learning policy to generate a reply to the user input based on the plurality of current utterance variables. A different reply may be obtained in response to an indication that the reply will lead to a breakdown, wherein the breakdown comprises an unhuman response from the automatic agent according to the machine learning policy. The machine learning policy may be adjusted based on the plurality of current utterance variables and the different reply.

17 Claims, 7 Drawing Sheets

(56) References Cited

U.S. PATENT DOCUMENTS

| | | | | |
|---|---|---|---|---|
| 2019/0340527 | A1* | 11/2019 | Liden | G06F 3/04817 |
| 2020/0097814 | A1* | 3/2020 | Devesa | G06N 3/08 |
| 2020/0152184 | A1* | 5/2020 | Steedman Henderson | G06F 40/35 |
| 2020/0160841 | A1* | 5/2020 | Lee | G10L 15/063 |
| 2020/0310749 | A1* | 10/2020 | Miller | G06F 9/4881 |
| 2020/0351175 | A1* | 11/2020 | Venkiteswaran | G06F 3/14 |
| 2021/0027771 | A1* | 1/2021 | Hall | G06F 16/3344 |
| 2022/0164225 | A1* | 5/2022 | Knight | G06N 3/006 |
| 2022/0180857 | A1* | 6/2022 | Aharoni | G10L 15/063 |
| 2022/0211029 | A1* | 7/2022 | Moskowitz | A61K 35/14 |

OTHER PUBLICATIONS

Bhuwan Dhingra et al., "End-to-End Reinforcement Learning of Dialogue Agents for Information Access", arXiv:1609.00777V2 [cs CL] Oct. 31, 2016.
Mihail Eric et al., "Key-value retrieval networks for task-oriented dialogue", ArXiv:1705.05414v2 [cs.CL] Jul. 14, 2017.
Miguel Espla-Gomis et al., "Paracrawl: Web-scale parallel corpora for the languages of the EU", Proceedings of MT Summit XXII, vol. 2, Dublin, Aug. 19-23, 2019, pp. 118-119.
Norman M. Fraser et al., "Simulating Speech Systems", 1991, Computer Speech & Language, 5(1):81-99.
A.G. Hauptmann, "Speech and gestures for graphic image manipulation", CHI'89 Proceedings, May 1989, pp. 241-245.
Matthew Henderson et al., "The second dialog state tracking challenge", 2014, In Proc. SIGDIAL.
William J. Hutchins et al., "An Introduction to Machine Translation", Table of Contents, 1992, Academic Press.
Daniel Jurafsky et al., "Speech and Language Processing", Second Edition, Chapter I: Introduction, Chapter 24: Chatbot & Dialogue Systems, 2020.
J.F. Kelley, "An Iterative Design Methodology for User-Friendly Natural Language Office Information Applications", 1984, ACM Trans. Inf. Syst., 2:26-41.
Dara Kerr, "Uber Dials it Back 20 Years, Bringing its Ride Service to Feature Phones", 2020, CNET. Feb. 13, 2020. https://cnet.co/3fPG7rC.
Philipp Koehn et al., "Moses: Open Source Toolkit for Statistical Machine Translation", Proceedings of the ACL 2007 Demo and Poster Sessions, Jun. 2007, Prague, pp. 177-180.
Xiujun Li et al., "End-to-End Task-Completion Neural Dialogue Systems", arXiv:1703.01008v4 [cs.CL] Feb. 11, 2018.
Abhinav Rastogi et al., "Towards Scalable Multi-Domain Conversational Agents: The Schema-Guided Dialogue Dataset", arXiv:1909.05855v2 [cs.CL] Jan. 29, 2020.
Verena Rieser et al., "A Corpus Collection and Annotation Framework for Learning Multimodal Clarification Strategies", 2005, In Proc. SIGDIAL.
Pararth Shah et al., "Bootstrapping a Neural Conversational Agent with Dialogue Self-Play, Crowdsourcing and On-Line Reinforcement Learning", 2018, In Proc. NAACL-HLT.
Ilya Sutskever et al., "Sequence to Sequence Learning with Neural Networks", arXiv:1409.3215v3 [cs.CL] Dec. 14, 2014.
Ashish Vaswani et al., "Attention is All You Need", arXiv:1706.03762v5 [cs.CL] Dec. 6, 2017.
Wei Wei et al., "AirDialogue: An Environment for Goal-Oriented Dialogue Research", Proceedings of the 2018 Conference on Empirical Methods in Natural Language Processing, Brussels, Belgium, Oct. 31-Nov. 4, 2018, pp. 3844-3854.
Jason D. Williams et al., "The Dialog State Tracking Challenge Series", AI Magazine, Competition Reports, Winter 2014, pp. 121-124.
Jason D. Williams et al., "End-to-End LSTM-Based Dialog Control Optimized with Supervised and Reinforcement Learning", arXiv:1606.01269v1 [cs.CL] Jun. 3, 2016.
Thomas Wolf et al., "Huggingface's Transformers: State-of-the-Art Natural Language Processing", arXiv:1910.03771v5 [cs CL] Jul. 14, 2020.
Yizhe Zhang et al., "DialoGPT: Large-Scale Generative Pre-training for Conversational Response Generation", ar.Xiv:1911.00536v3 [cs CL] May 2, 2020.
Tiancheng Zhao et al., "Towards End-to-End Learning for Dialog State Tracking and Management Using Deep Reinforcement Learning", arXiv:1606.02560v2 [cS.AI] Sep. 15, 2016.
Pawel Budzianowski et al., "MultiWOZ—a large-scale multi-domain Wizard-of-Oz dataset for task-oriented dialogue modelling", Proceedings of the 2018 Conference on Empirical Methods in Natural Language Processing, Brussels, Belgium, Oct. 31-Nov. 4, 2018, pp. 5016-5026.
Jacob Devlin et al., "Bert: Pre-training of Deep Bidirectional Transformers for Language Understanding", arXiv:1810.04805V2 [cs.CL] May 24, 2019.
Layla El Asri et al., "Frames: a corpus for adding memory to goal-oriented dialogue systems", 2017, Proc. SIGDIAL, arXiv:1704.00057v2 [cs.CL] Apr. 13, 2017.
Alec Radford et al., "Language models are unsupervised multitask learners", 2019.
Tsung-Hsien Wen et al., "A network-based End-to-End Trainable Task-oriented Dialogue System", 2017, Proc. EACL, arXiv:1604 04562V3 [cs.CL] Apr. 24, 2017.

* cited by examiner

TASK-ORIENTED DIALOG SYSTEM AND METHOD THROUGH FEEDBACK

TECHNICAL FIELD

The disclosure relates generally to improving an automatic agent through feedback when a breakdown occurs.

BACKGROUND

Human-machine interaction models may learn to perform simple actions in a human-like way. These models may be trained based on man-made rules, or by interacting with an environment and receiving feedbacks from the environment. However, human-machine interaction models may breakdown by responding in an unhuman fashion when the models encounter dialog they have not seen before. This application discloses a way to improve an automatic agent by providing feedback about mistakes so that the automatic agent may correct its behavior.

SUMMARY

Various embodiments of the specification include, but are not limited to, systems, methods, and non-transitory computer-readable media for improving an automatic agent.

In various implementations, a method may include receiving a user input through a user interface. The method may further include obtaining a plurality of current utterance variables by tokenizing the user input and generating a reply to the user input based on the plurality of current utterance variables and the automatic agent executing a machine learning policy. The method may further include obtaining a different reply in response to an indication that the reply will lead to a breakdown, wherein the breakdown comprises an unhuman response from the automatic agent according to the machine learning policy. The method may further include adjusting the machine learning policy based on the plurality of current utterance variables and the different reply.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include receiving a user input through a user interface. The operations may further include obtaining a plurality of current utterance variables by tokenizing the user input and generating a reply to the user input based on the plurality of current utterance variables and the automatic agent executing a machine learning policy. The operations may further include obtaining a different reply in response to an indication that the reply will lead to a breakdown, wherein the breakdown comprises an unhuman response from the automatic agent according to the machine learning policy. The operations may further include adjusting the machine learning policy based on the plurality of current utterance variables and the different reply.

Yet another aspect of the present disclosure is directed to a non-transitory computer-readable storage medium configured with instructions executable by one or more processors to cause the one or more processors to perform operations. The operations may include training a machine learning policy based on a training corpus, wherein the training corpus comprises a plurality of dialog samples. The operations may further include generating a reply to a user input based on an automatic agent executing the machine learning policy, and adjusting the machine learning policy based on a different reply in response to an indication that the reply will lead to a breakdown. The operations may further include deploying the automatic agent to interact with human users based on the adjusted machine learning policy.

In some embodiments, the indication that the reply will lead to the breakdown may be received from a user through the user interface.

In some embodiments, obtaining the different reply may include displaying a list of reply options on the user interface based on the plurality of current utterance variables and the machine learning policy. The list of reply options may include the reply and the different reply. A user selection of the different reply may be received from the list of reply options.

In some embodiments, the indication that the reply will lead to the breakdown may be received from the automatic agent. Receiving of indication may include the automatic agent first predicting that the reply will lead to the breakdown based on the plurality of current utterance variables and a machine learning policy. Then the automatic agent may generate the indication that the reply will lead to the breakdown in response to the prediction.

In some embodiments, obtaining the different reply may include the automatic agent generating a list of reply options to the user input based on the plurality of current utterance variables and the machine learning policy. The list of reply options may include the reply and the different reply. The automatic agent may select the different reply from the list of reply options.

In some embodiments, the breakdown may be avoided as a result of the different reply by preventing the unhuman response from the automatic agent.

In some embodiments, the different reply may be part of a sequence of actions to recover from the breakdown. The sequence of actions may include a recovery reply to the unknown user input. The sequence of actions may be received from a user through the user interface. A known user input that the automatic agent knows how to respond to may be received in response to the sequence of actions.

In some embodiments, generating the reply to the user input further may include the automatic agent determining a response template for the reply to the user input based on the plurality of current utterance variables and the machine learning policy. The automatic agent may determine an Application Programming Interface (API) call and one or more parameters for the API call, wherein the one or more parameters are based on one or more of the plurality of current utterance variables. The automatic agent may generate the reply to the user input based on the response template and a return from the API call.

In some embodiments, the return from the API call may include a latitude and longitude of a predicted location.

In some embodiments, the automatic agent may initially be trained based on a training corpus, and the training corpus may include a plurality of training samples. Each of the plurality of training samples may be collected by listing a plurality of utterance templates and a plurality of APIs in a GUI for a training agent to select from. A training user speech input may be tokenized into a plurality of training utterance variables. One or more of the plurality of utterance templates, one or more of the plurality of APIs, and one or more of the plurality of training utterance variables that the training agent selects through the GUI in response to the training user speech input may be recorded as the training sample.

In some embodiments, each of the plurality of training samples may be recorded as fully-executable Python code.

In some embodiments, adjusting the machine learning policy based on the different reply may include updating the training corpus based on the plurality of current utterance variables and the different reply. The automatic agent may be retrained based on the updated training corpus.

In some embodiments, the user input through the user interface may include a user speech input through a voice user interface.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the behavior of an automatic agent by providing feedback about mistakes and encouraging the automatic agent to correct its behavior. For example, supervised learning may be used, wherein a sympathetic human user may correct mistakes made by the automatic agent. In some embodiments, the automatic agent may initially be trained in a learning mode. The automatic agent may analyze static, recorded human/human dialogs to learn its own dialog strategies. The automatic agent may not work interactively with human users in this mode. In some embodiments, the automatic agent may be deployed to interact with real-world human users in a deployment mode. The agent may not learn, but simply apply its learned dialog strategies while attempting to solve human users' problems. A two-mode approach may have the problem that in deployment mode, the automatic agent can quickly go "off the rails" after making one mistake (saying the wrong thing, or calling the wrong API). The automatic agent may find itself in a situation that the learning mode didn't prepare it for, so things may deteriorate quickly, and the agent may not be able to solve the user's problem.

The environment may be extended to include an improvement mode to prevent dialogs from deteriorating. The automatic agent may interact with a sympathetic user, who points out the agent's mistakes and encourages the agent to correct its behavior. The improvement mode may allow an automatic agent operating in a "push button" environment to improve itself while interacting with human users.

Figure 1:
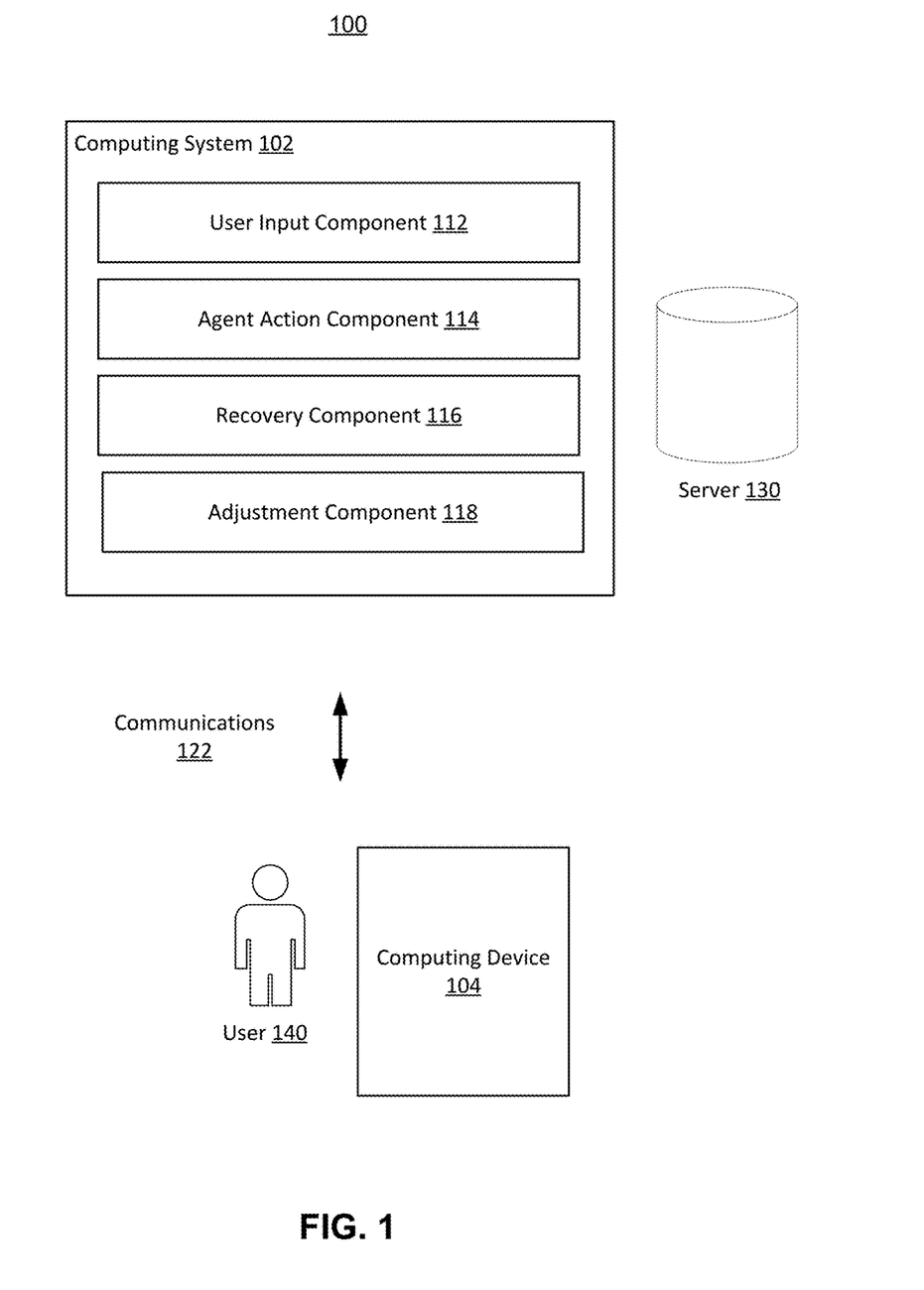
FIG. 1 illustrates an exemplary system to which techniques for improving an automatic agent may be applied, in accordance with various embodiments.

FIG. 1 illustrates an exemplary system 100 to which techniques for improving an automatic agent may be applied, in accordance with various embodiments. The example system 100 may include a computing system 102 and a computing device 104. It is to be understood that although one computing device is shown in FIG. 1, any number of computing devices may be included in the system 100. Computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices that are distributed across a network. The computing system 102 may include a ridesharing application, an artificial-intelligent assistant, an autonomous driving car, or another suitable smart device.

The computing device 104 may be implemented on or as various devices such as a mobile phone, tablet, server, desktop computer, laptop computer, etc. The computing system 102 may communicate with the computing device 104, and other computing devices. Computing device 104 may communicate with other computing devices through computing system 102, and may communicate with computing devices directly. Communication between devices may occur over the internet, through a local network (e.g., LAN), or through direct communication (e.g., BLUETOOTH™, radio frequency, infrared). In some embodiments, communications 122 may include instructions from the user 140 of computing device 104 and replies from the computing system 102.

In some embodiments, the system 100 may include a ridesharing platform. The ridesharing platform may facilitate transportation service by connecting drivers of vehicles with passengers. The platform may accept requests for transportation from passengers, identify idle vehicles to fulfill the requests, arrange for pick-ups, and process transactions. For example, user 140 may use the computing device 104 to order a trip. The trip order may be included in communications 122. The computing device 104 may be installed with a software application, a web application, an API, or another suitable interface associated with the ridesharing platform.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include a user input component 112, agent action component 114, recovery component 116, and adjustment component 118. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

The user input component 112 may be configured to receive a user input through a user interface. In some embodiments, the user input through the user interface may include a user speech input through a voice user interface. For example, the user may specify a trip destination to a speech-only assistant. The user may talk to an in-home smart-speaker to order a shared-ride vehicle, or the user may tell an autonomous vehicle where to go. In some embodiments, the user input through the user interface may include a typed message. For example, the user may send a text message through an application on a mobile device. The application may be a ride-sharing application installed on the user's phone.

The agent action component 114 may be configured to obtain a plurality of current utterance variables by tokenizing the user input. Obtaining information may include one or more of accessing, acquiring, analyzing, determining, examining, identifying, loading, locating, opening, receiving, retrieving, reviewing, storing, or otherwise obtaining the information. Tokenizing the user input may include splitting each word or phrase into a separate variable.

The agent action component 114 may further be configured to generate a reply to the user input based on the plurality of current utterance variables and an automatic agent executing a machine learning policy. The agent action component 114 may include the automatic agent (e.g., a software function or module), and the reply to the user input may be generated according to the machine learning policy learned by the automatic agent. The reply may be constructed to mimic a human-like response as part of a conversation. The user input and the reply may be part of a dialog between a user and an agent. In some embodiments, the reply may include an audio output through a voice user interface. In some embodiments, the reply may include a text message displayed on a Graphical User Interface (GUI).

In some embodiments, generating the reply to the user input may further include determining a response template for the reply to the user input based on the plurality of current utterance variables and the automatic agent executing the machine learning policy. An Application Programming Interface (API) call and one or more parameters for the API call may be determined by the automatic agent. The one or more parameters may be based on one or more of the plurality of current utterance variables. The reply to the user input may be generated by the automatic agent based on the response template and a return from the API call. In some embodiments, the return from the API call may include a latitude and longitude of the predicted destination.

In some embodiments, the automatic agent may initially be trained based on a training corpus, and the training corpus may include a plurality of training samples. Each of the plurality of training samples may be collected by listing a plurality of utterance templates and a plurality of APIs in a GUI for a training agent to select from. A training user speech input may be tokenized into a plurality of training utterance variables. One or more of the plurality of training utterance templates, one or more of the plurality of APIs, and one or more of the plurality of training utterance variables that the training agent selects through the GUI in response to the training user speech input may be recorded as the training sample. In some embodiments, each of the plurality of training samples may be recorded as fully-executable Python code. Running the session log file may generate a faithful replay of the session, in which the same APIs are called, and the same utterances are formed. In some embodiments, a machine learning policy may be trained based on a training corpus, wherein the training corpus comprises a plurality of dialog samples. The automatic agent may execute the machine learning policy.

The recovery component 116 may be configured to obtain a different reply in response to an indication that the reply will lead to a breakdown. The breakdown may include an unhuman response from the automatic agent according to the machine learning policy. In some embodiments, the unhuman response from the automatic agent may be a replay to an unknown user input. The unknown user input may be reviewed in response to sending the reply. The unknown user input may include a communication from a user that the automatic agent does not know how to respond to. In some embodiments, the unhuman response from the automatic agent may be caused by selecting an incorrect machine learning policy during a learning mode, or as a result of a glitch by the automatic agent. In some embodiments, the indication that the reply will lead to the breakdown may be received from a user through the user interface. A GUI for training the automatic agent may be extended to allow a human user to note the moment when a human/agent dialog breaks down. Breakdown detection from the user may allow the automatic agent to be trained on dialogs in which the user corrects breakdowns.

In some embodiments, the different reply may be obtained by displaying a list of reply options on the user interface based on the plurality of current utterance variables and a machine learning policy. The list of reply options may include the reply and the different reply. The different reply may be received from a user selection of the different reply from the list of reply options. For example, the GUI for training the automatic agent may further be extended to let a human user not only identify an agent error (the one that causes a breakdown), but also correct that error. For example, the human user may be shown the three most-likely agent actions (e.g., in the automatic agent's own estimation), and allow the human user to redirect the agent to select option two or three, then continue with the dialog.

In some embodiments, each agent action may be selected from a beam-search. The beams of alternate agent actions may be together with other dialog events. The serialization of dialog state and alternate actions may allow users to back-up to a previous dialog turn and replace agent actions with alternative agent actions. Similarly, the serialization of all dialog events and agent actions may allow users to examine the sequence of agent actions that produced an agent utterance. Users may select an action to correct from these sequences of agent actions.

In some embodiments, the indication that the reply will lead to the breakdown may be received from the automatic agent by the automatic agent first predicting that the reply will lead to the breakdown based on the plurality of current utterance variables and a machine learning policy. Then the automatic agent may generate the indication that the reply will lead to the breakdown in response to the prediction. For example, the machine learning policy may be trained to predict the breakdown through reinforcement learning. The automatic agent may receive a reward when it successfully predicts a breakdown.

In some embodiments, the different reply may be obtained by the automatic agent generating a list of reply options to the user input based on the plurality of current utterance variables and a machine learning policy. The list of reply options may include the reply and the different reply. The automatic agent may select the different reply from the list of reply options. In some embodiments, the breakdown may be avoided as a result of the different reply by preventing the unhuman response from the automatic agent. For example, the different reply may completely avoid the breakdown by preventing the unknown user input that the automatic agent does not know how to respond to. For example, when the automatic agent is in deployment mode, if the automatic agent predicts that its best action will lead to a breakdown, it may pick a different action instead. This different action may prevent a breakdown from occurring.

In some embodiments, the different reply may be part of a sequence of actions to recover from the breakdown. The sequence of actions may include a recovery reply to the unknown user input. The sequence of actions may be received from a user through the user interface. A known user input that the automatic agent knows how to respond to may be received in response to the sequence of actions. For example, the human user may let the automatic agent make its initial error, then the human may respond naturally (e.g., "What'?" or "No, I don't want to go there" or "No, I meant Starbucks"). Initially, the automatic agent's next action tends to be an even worse error, because it has never seen such user utterances during the learning mode. The human may then repair the automatic agent's action by teaching it how to recover from a mistake and not go "off the rails". For example, the GUI for training the automatic agent may further be extended to let the human user input recovery strategies for when the automatic agent encounters similar unknown user inputs. The recovery strategies may include generic responses to the similar unknown user inputs, a reply that tries to start the conversation over again, or repeating a previous reply from the automatic agent. In some embodiments, the automatic agent may be trained in determining how to respond to unknown user inputs during a breakdown. The automatic agent may continue responding until a known user input that the automatic agent knows how to respond to is received.

The adjustment component 118 may be configured to adjust the machine learning policy based on the plurality of current utterance variables and the different reply. In some embodiments, adjusting the machine learning policy based on the different reply may include updating the training corpus based on the plurality of current utterance variables and the different reply. The automatic agent may then be retrained based on the updated training corpus. For example, the revised dialog sequences may be added to the existing human/human dialogs and the learning mode may be run again. In some embodiments, reinforcement learning algorithms may learn from serialized dialogs by replaying breakdowns and corrections that took place in user experiences. The automatic agent may receive a reward for predicting a breakdown and/or recovering from a breakdown.

In some embodiments, a deployment mode may be entered after the machine learning policy is adjusted. The automatic agent may be deployed to interact with human users based on the adjusted machine learning policy. In some embodiments, adjusting the machine learning policy may include updating the machine learning policy in the deployment mode. For example, continuous learning methods may be used to learn from user corrections post-deployment. In some embodiments, adjusting the machine learning policy may include solving a binary classification problem. Dialog breakdowns that produced corrections may be used to learn in a mistake driven fashion. The automatic agent may learn to predict if an action is going to lead to a break down.

In some embodiments, after an alternate action is selected and executed, the automatic agent may use the newly created state to execute new actions until a new agent utterance is displayed on the GUI. New dialog forks may be corrected in the same ways as the original dialog. After a dialog is completed, all the dialog forks including breakdowns and corrections may be serialized. These serialized events may be used for further agent learning.

Figure 2:
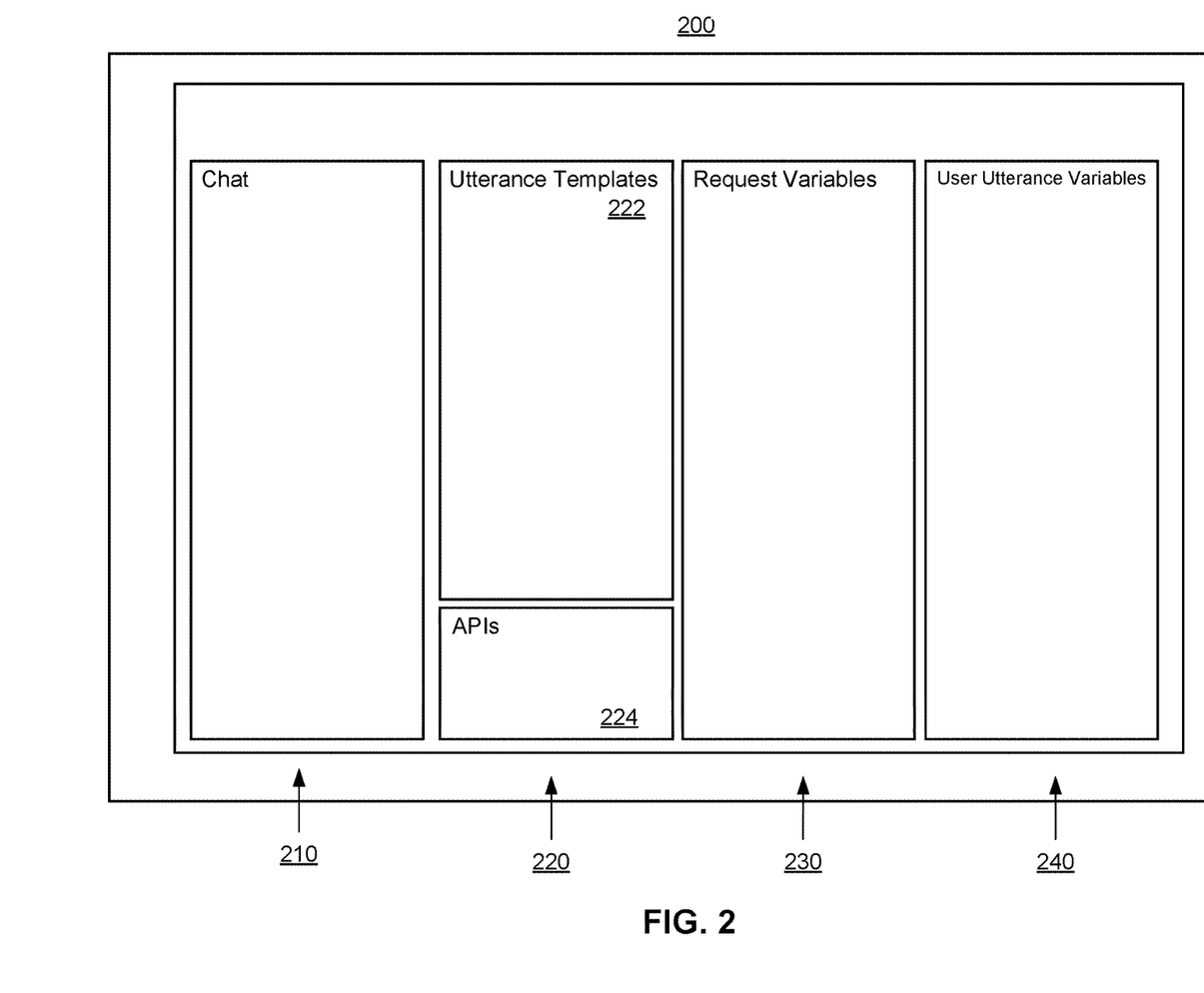
FIG. 2 illustrates exemplary push button interface, in accordance with various embodiments.

FIG. 2 illustrates exemplary push button interface 200, in accordance with various embodiments. In some embodiments, the automatic agent may be trained to mimic a human agent interacting with push button interface 200. In some embodiments, a human agent may respond to a human user with push button interface 200 to collect natural language dialogs in a task-oriented domain. The automatic agent may be built using machine learning techniques by analyzing the collected dialogs. The automatic agent may try to click the same buttons as the human agent, when similar situations arise. Both the human agent and automatic agent may try to determine the lat/long address of where the user wants to go, and to arrange a shared-ride car to take the user there. The agent (e.g., the human agent or the automatic agent) may select utterance templates (e.g., by clicking buttons in the interface), such as "X is Y minutes away" and select to fill the parameters X and Y. The agent may additionally make API calls, such as to find information about Starbucks, that may provide the agent will additional selectable information (e.g., display more clickable information).

The push button interface 200 may constrain the agent's actions and utterances. The first panel 210 may show a chat with a user. The second agent panel 220 may show the agent's available actions, including utterance templates 222 and API calls 224. Results of API calls may be shown in the third agent panel 230, and tokenized user utterances may be shown in the fourth agent panel 240.

In some embodiments, agent actions may be restricted to a sequence of clicks. For example, after the user provides "I want to go to Starbucks on Venice Boulevard", the agent may perform the following sequence of actions. First, the agent may click on find_place API from Google. This API takes a string argument and a source latitude longitude pair. The agent may then click on the words "Starbucks", "Venice", and "Boulevard" in the fourth panel, and click on the source latitude longitude pair in the third panel. This may call the find_place API in real-time and further populate the third panel with its result, collected under v1. Next, the agent may click on the distance_matrix API. This API may take two addresses, and return the time and distance between them. The agent may click on the address field of variable v1 (e.g., Starbucks), the click on the address field of source. This may call the distance_matrix API and further populate the third panel. Next, the agent may click on the template "{ } on { } is { } minutes away." This template may take three arguments. The agent may click on the name field of variable v1 (e.g., "Starbucks"), the street name field of variable v1 (e.g., "Venice Boulevard"), and the duration field of variable v2. Finally, the agent may click on the template "Shall we go?" These 11 clicks may result in sending the following response to the user: "Starbucks on Venice Boulevard is 10 minutes away. Shall we go?"

In some embodiments, an agent may click on "+" at any time to make a new utterance template, which then may be made available to all agents. The constrained interface may allow all of the agent's actions, not just their words, to be logged and made available for analysis. No additional dialog annotations may be required from agents or users. In some embodiments, push button interface 200 may be used to respond to users' questions about the weather.

Figure 3A:
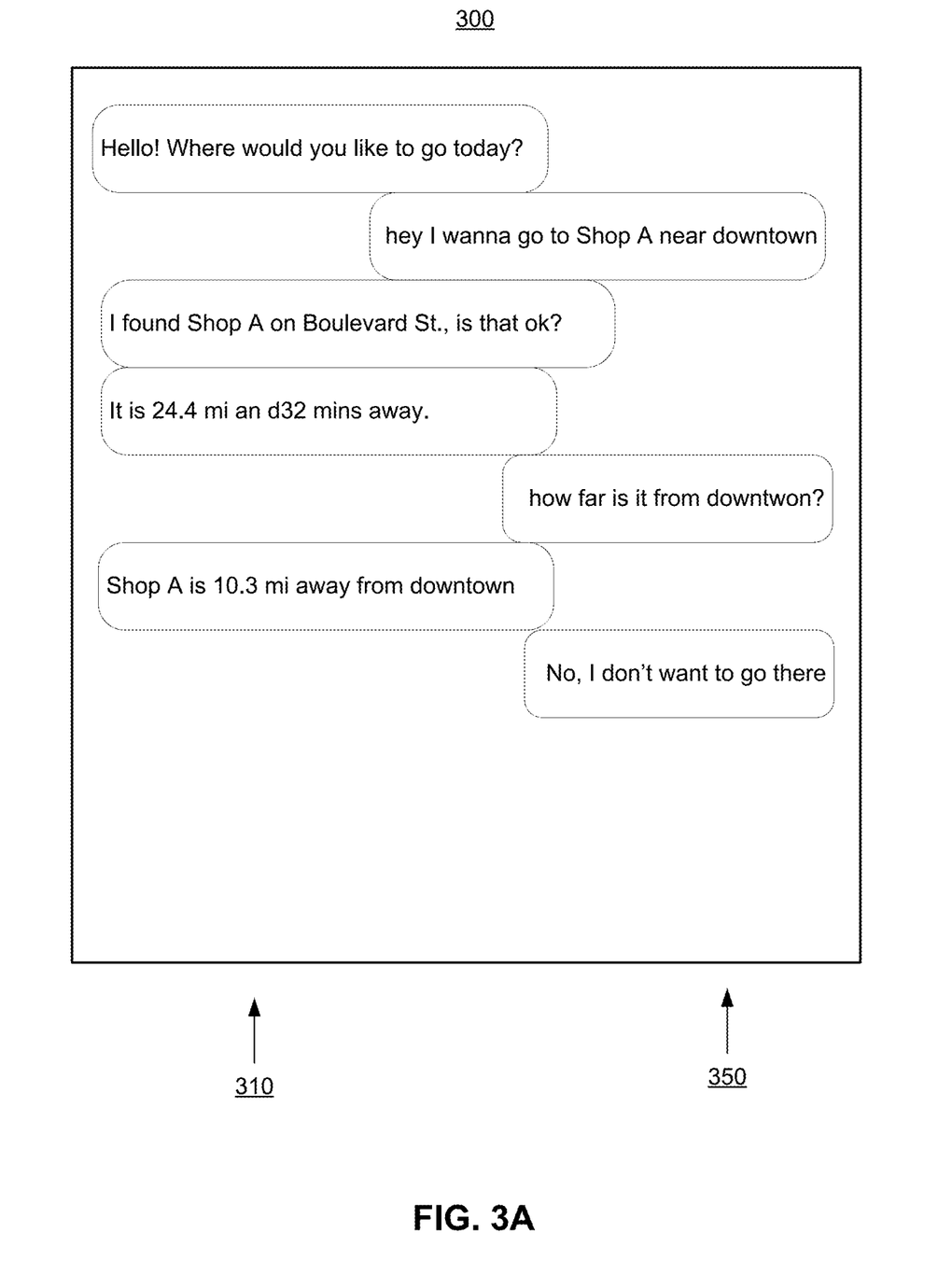
FIG. 3A-3C illustrate an exemplary breakdown identification and repair interface, in accordance with various embodiments
Figure 3B:
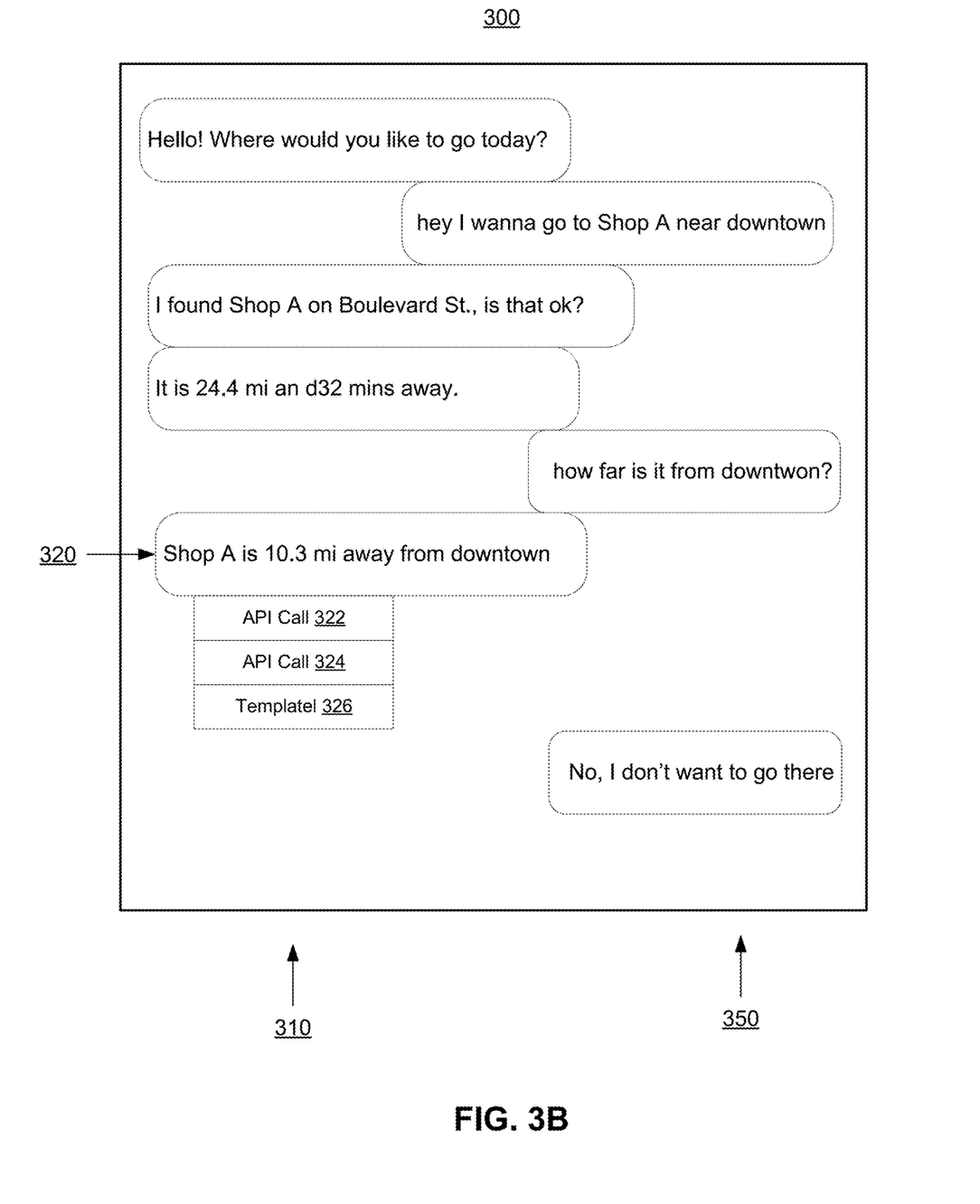
Figure 3C:
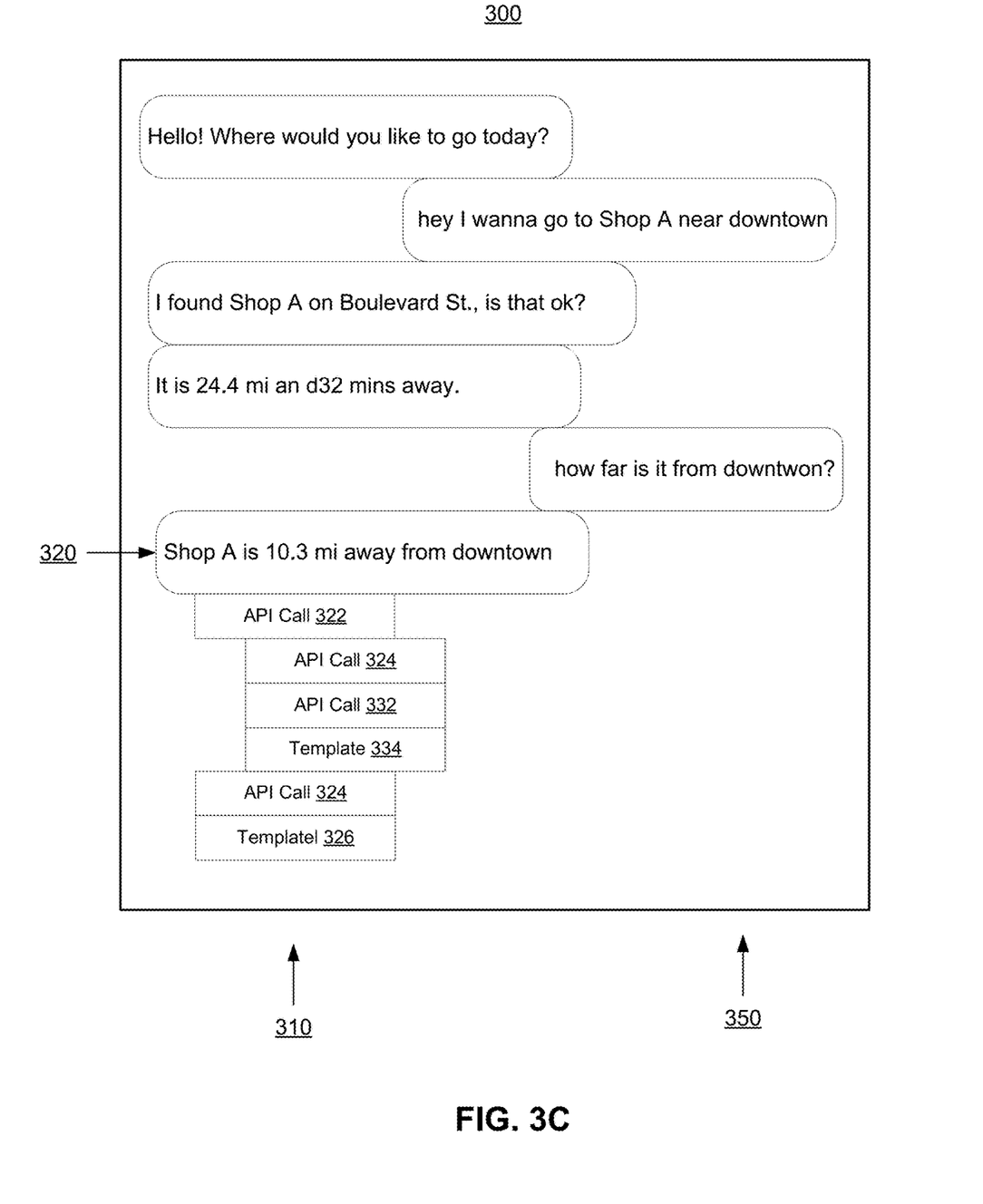

FIG. 3A-3C illustrate an exemplary breakdown identification and repair interface 300, in accordance with various embodiments. Training the automatic agent to mimic a human agent may require a very large number of dialogs to be collected. In many situations, it is not practical to collect enough dialogs to support effective machine learning. In some embodiments, breakdown identification and repair interface 300 may be used to improve the automatic agent after initially being trained based on dialogs. Thus, this learning method may not limited by the number of human/human dialogs collected. In some embodiments, breakdown identification and repair interface 300 may be displayed after an improvement mode is entered.

The breakdown identification and repair interface 300 may include agent communications 310 and user communications 350. The agent communications 310 may be obtained from an automatic agent based on a machine learning policy. The user communications 350 may be obtained from text input though a GUI or from speech input through a voice user interface. For example, the text of user communications 350 may be obtained through voice recognition. The agent communications 310 may include reply 320. A sympathetic user may indicate that the reply 320 will lead to a breakdown by selecting the reply 320. For example, a user may click on the reply 320, move a cursor over the reply 320, or enter a keyboard shortcut to select the reply 320.

The sequence of agent actions that produced the reply 320 may be displayed as a dropdown on the breakdown identification and repair interface 300 in response to the indication that the reply 320 will lead to a breakdown. The sequence of agent actions may include API Call 322, API Call 324, and Template 326. A list of alternative agent actions may be displayed non the breakdown identification and repair interface 300 in response to a selection of one of the agent actions in the sequence of agent actions. Selecting an interface element may include clicking the element, moving the cursor over the element, or entering a keyboard shortcut to select the element. A list of alternative agent actions displayed in response to selecting API Call 322 may include API Call 324, API Call 332, and Template 334. Selecting an action from the list of alternative agent actions may produce a different reply to replace the reply 320. The different reply may produce a new (i.e., corrected) dialog trajectory.

Figure 4:
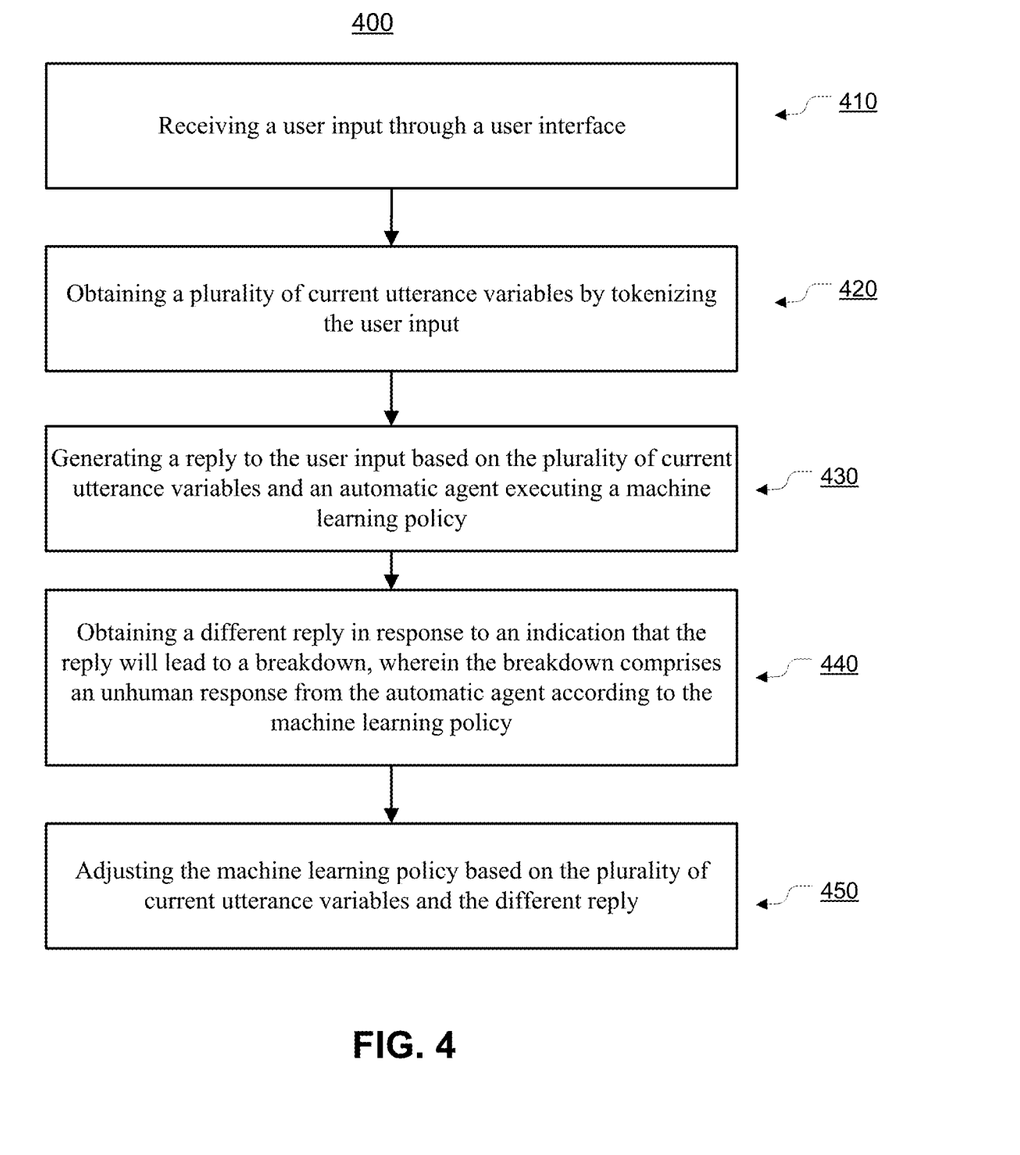
FIG. 4 illustrates a flowchart of an exemplary method, according to various embodiments of the present disclosure.

FIG. 4 illustrates a flowchart of an exemplary method 400, according to various embodiments of the present disclosure. The method 400 may be implemented in various environments including, for example, the system 100 of FIG. 1. The method 400 may be performed by computing system 102. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 410, a user input may be received through a user interface. At block 420, a plurality of current utterance variables may be obtained by tokenizing the user input. At block 430, a reply to the user input may be generated based on the plurality of current utterance variables and an automatic agent executing a machine learning policy. At block 440, a different reply may be obtained in response to an indication that the reply will lead to a breakdown, wherein the breakdown comprises an unhuman response from the automatic agent according to the machine learning policy. At block 450, the machine learning policy may be adjusted based on the plurality of current utterance variables and the different reply.

Figure 5:
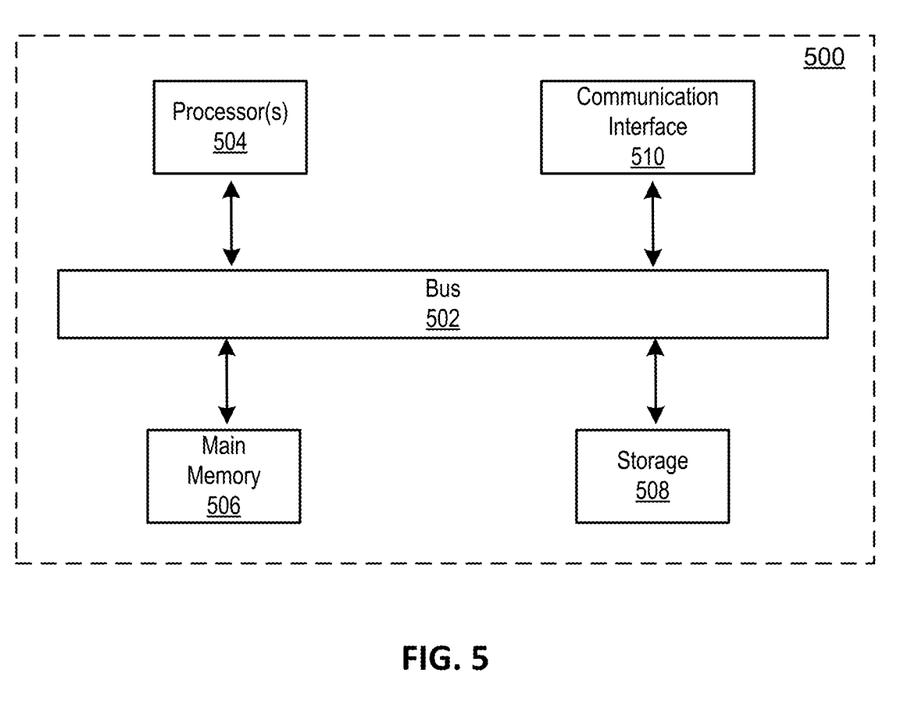
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement the computing system 102 or one or more components of the computing system 102 shown in FIG. 1. As another example, the process/method shown in FIG. 4 and described in connection with this figure may be implemented by computer program instructions stored in main memory 506. When these instructions are executed by processor(s) 504, they may perform the steps as shown in FIG. 4 and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for improving an automatic agent, comprising:
   receiving a user input through a user interface;
   obtaining a plurality of current utterance variables by tokenizing the user input;
   generating a reply to the user input based on the plurality of current utterance variables and the automatic agent executing a machine learning policy, wherein the generating the reply comprises triggering one or more Application Programming Interface (API) calls according to the machine learning policy;
   displaying the reply on the user interface;
   in response to detecting a first user action applied to the generated reply, displaying the one or more triggered API calls;
   in response to detecting a second user action applied to one of the one or more triggered API calls, displaying an alternative API call;
   detecting a third user action applied to the alternative API call, and obtaining a different reply by triggering the alternative API call; and
   adjusting the machine learning policy based on the plurality of current utterance variables, the alternative API call, and the different reply.

2. The method of claim 1, wherein the displaying the alternative API call comprises:
   displaying a list of reply options on the user interface based on the plurality of current utterance variables and the alternative API call; and
   wherein the detecting the third user action comprises:
   receiving a user selection from the list of reply options.

3. The method of claim 1, further comprising:
   predicting, by the automatic agent, that the reply will lead to a breakdown based on the plurality of current utterance variables and the machine learning policy; and
   generating, by the automatic agent, an indication that the reply will lead to the breakdown in response to the prediction.

4. The method of claim 1, wherein the obtaining the different reply comprises:
   generating, by the automatic agent, a list of reply options to the user input based on the plurality of current utterance variables, the alternative API call, and the machine learning policy, wherein the list of reply options comprises the reply and the different reply; and
   selecting, by the automatic agent, the different reply from the list of reply options.

5. The method of claim 1, further comprising:
   avoiding a breakdown as a result of the different reply by preventing unhuman response from the automatic agent.

6. The method of claim 1, wherein:
   the different reply is part of a sequence of actions to recover from a breakdown;
   the sequence of actions comprises a recovery reply to an unknown user input; and
   the method further comprises:
     receiving the sequence of actions from a user through the user interface; and
     receiving a known user input that the automatic agent knows how to respond to in response to the sequence of actions.

7. The method of claim 1, wherein generating the reply to the user input further comprises:
- determining a response template for the reply to the user input based on the plurality of current utterance variables and the automatic agent executing the machine learning policy;
- determining an API call and one or more parameters for the API call, wherein the one or more parameters are based on one or more of the plurality of current utterance variables; and
- generating the reply to the user input based on the response template and a return from the API call.

8. The method of claim 7, wherein the return from the API call comprises a latitude and longitude of a predicted location.

9. The method of claim 1, wherein the automatic agent is initially trained based on a training corpus, wherein the training corpus comprises a plurality of training samples, and each of the plurality of training samples are collected by:
- listing a plurality of utterance templates and a plurality of APIs in a Graphical User Interface (GUI) for a training agent to select from;
- tokenizing a training user speech input into a plurality of training utterance variables; and
- recording one or more of the plurality of utterance templates, one or more of the plurality of APIs, and one or more of the plurality of training utterance variables that the training agent selects through the GUI in response to the training user speech input as a training sample.

10. The method of claim 9, wherein each of the plurality of training samples are recorded as fully-executable Python code.

11. The method of claim 9, wherein adjusting the machine learning policy based on the different reply comprises:
- updating the training corpus based on the plurality of current utterance variables and the different reply or the alternative API; and
- retraining the automatic agent based on the updated training corpus.

12. The method of claim 1, wherein the user input through the user interface comprises a user speech input through a voice user interface.

13. A system for improving an automatic agent, comprising one or more processors and one or more non-transitory computer-readable memories coupled to the one or more processors and configured with instructions executable by the one or more processors to cause the system to perform operations, wherein the operations comprise:
- receiving a user input through a user interface;
- obtaining a plurality of current utterance variables by tokenizing the user input;
- generating a reply to the user input based on the plurality of current utterance variables and the automatic agent executing a machine learning policy, wherein the generating the reply comprises triggering one or more Application Programming Interface (API) calls according to the machine learning policy;
- displaying the reply on the user interface;
- in response to detecting a first user action applied to the generated reply, displaying the one or more triggered API calls;
- in response to detecting a second user action applied to one of the one or more triggered API calls, displaying an alternative API call;
- detecting a third user action applied to the alternative API call, and obtaining a different reply by triggering the alternative API call; and
- adjusting the machine learning policy based on the plurality of current utterance variables, the alternative API call, and the different reply.

14. The system of claim 13, wherein the displaying the alternative API call comprises:
- displaying a list of reply options on the user interface based on the plurality of current utterance variables and the alternative API call; and
- wherein the detecting the third user action comprises:
- receiving a user selection from the list of reply options.

15. The system of claim 13, the operations further comprising:
- predicting, by the automatic agent, that the reply will lead to a breakdown based on the plurality of current utterance variables and the machine learning policy; and
- generating, by the automatic agent, an indication that the reply will lead to the breakdown in response to the prediction.

16. The system of claim 13, wherein the obtaining the different reply comprises:
- generating, by the automatic agent, a list of reply options to the user input based on the plurality of current utterance variables, the alternative API call, and the machine learning policy, wherein the list of reply options comprises the reply and the different reply; and
- selecting, by the automatic agent, the different reply from the list of reply options.

17. The system of claim 13, further comprising:
- avoiding a breakdown as a result of the different reply by preventing unhuman response from the automatic agent.

* * * * *